United States Patent [19]
Leeds et al.

[11] Patent Number: 5,437,535
[45] Date of Patent: Aug. 1, 1995

[54] BRICK DEHACKER

[75] Inventors: Harry D. Leeds, Clarksville, Ark.; Thomas M. Fisher, Enka; Paula S. Fann, Asheville, both of N.C.

[73] Assignee: Artech, Clarksville, Ark.

[21] Appl. No.: 69,011

[22] Filed: May 28, 1993

[51] Int. Cl.$^6$ ............................................. B65G 57/32
[52] U.S. Cl. .................... 414/798.3; 198/430; 198/432; 414/789.8
[58] Field of Search ............... 198/374, 430, 432, 434; 414/788, 788.1, 788.4, 789.8, 792.9, 798.2, 798.3, 798.9

[56] References Cited
U.S. PATENT DOCUMENTS

| | | |
|---|---|---|
| 3,669,283 | 6/1972 | Brown, Jr. .................... 198/374 |
| 3,776,398 | 12/1973 | Stuart et al. . |
| 3,837,466 | 9/1974 | Jones .................... 198/434 |
| 3,964,597 | 6/1976 | Brown et al. .................... 198/21 |
| 4,018,324 | 4/1977 | Kamphues .................... 198/434 |
| 4,134,485 | 1/1979 | George .................... 198/434 |
| 4,161,368 | 7/1979 | Batzdorff .................... 198/434 |
| 4,273,489 | 6/1981 | Lingl, Jr. et al. .................... 198/434 |
| 5,054,994 | 8/1991 | Leeds et al. .................... 414/793.4 |

Primary Examiner—Michael S. Huppert
Assistant Examiner—Gregory A. Morse
Attorney, Agent, or Firm—Rhodes, Coats & Bennett

[57] ABSTRACT

A brick dehacking apparatus is disclosed. The dehacker is operable to vary the number of rows of brick and number of brick in a row of brick courses removed from a kiln car and selectively combine and alternate courses of brick removed from at least two kiln cars in preparation for stacking and straping.

21 Claims, 15 Drawing Sheets

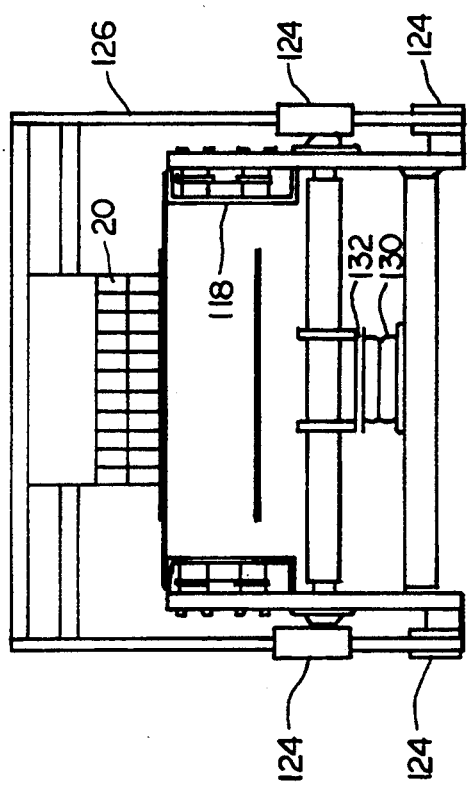
FIG. 3
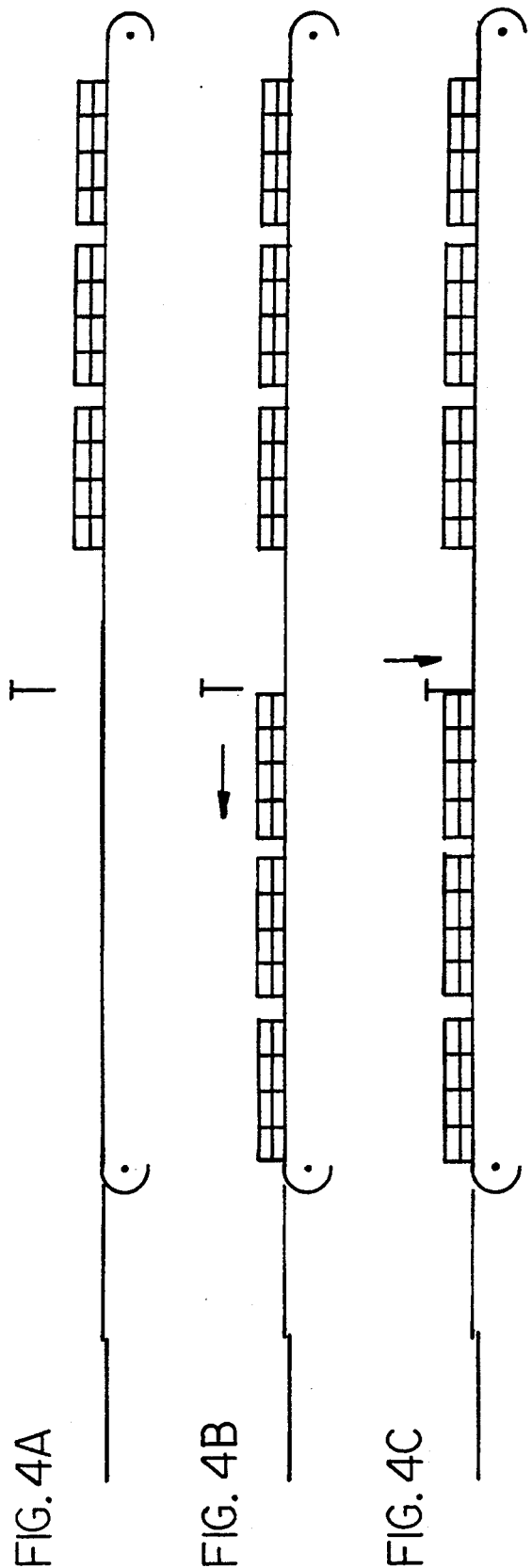
FIG. 4A
FIG. 4B
FIG. 4C

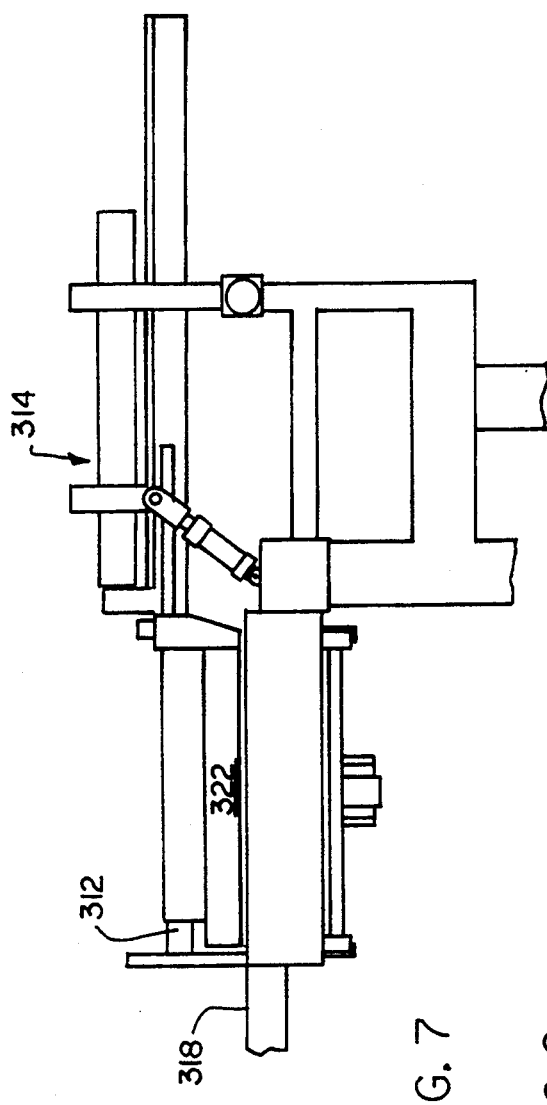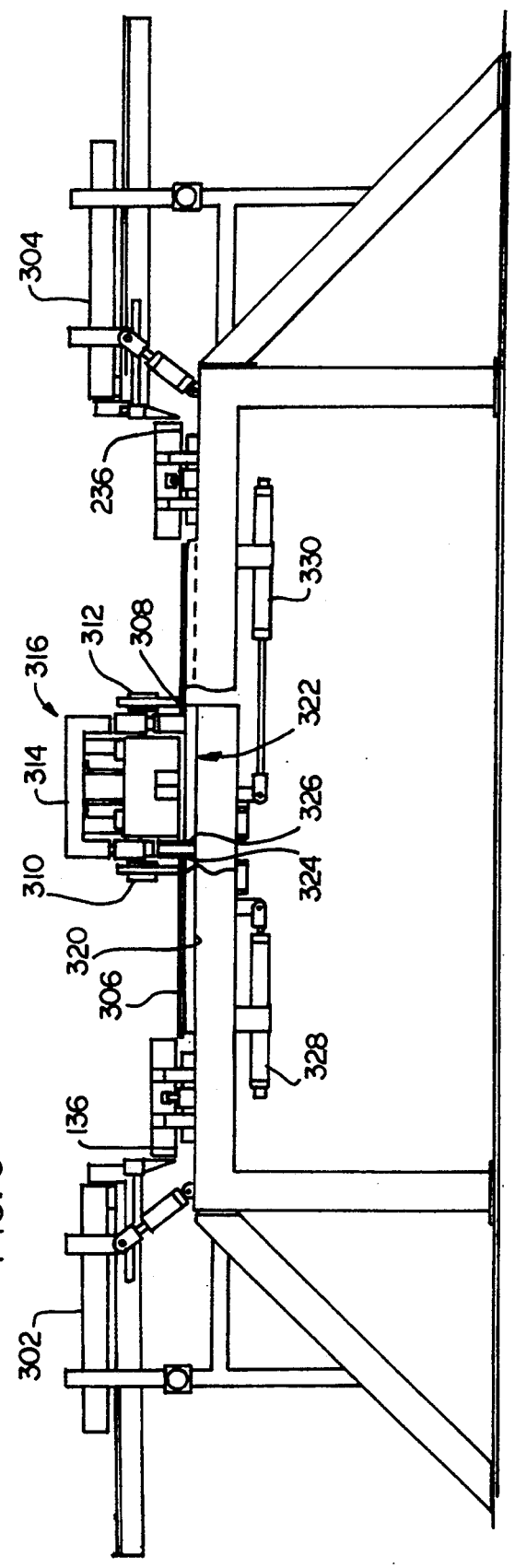
FIG. 7
FIG. 6

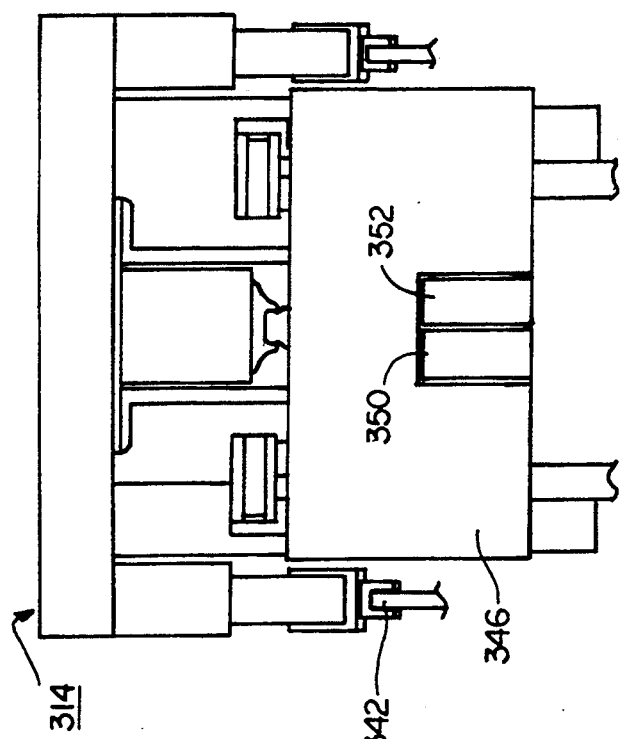
FIG. 13
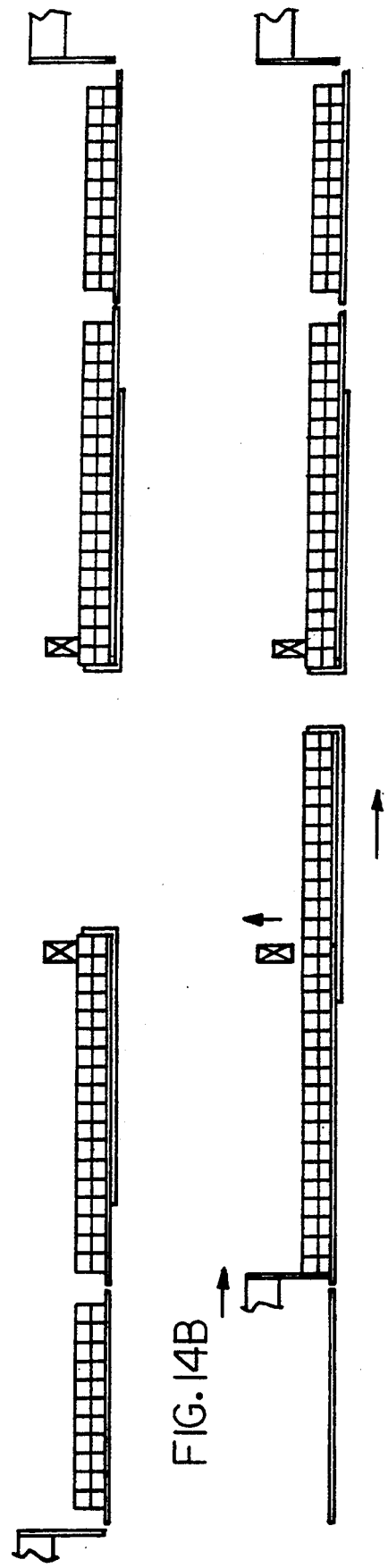
FIG. 14A
FIG. 14B

BRICK DEHACKER

BACKGROUND OF THE INVENTION (1) Field of the Invention

The present invention relates generally to the manufacture of brick and, more particularly, to an apparatus for blending courses of brick from two kiln cars.

(2) Description of the Prior Art

Bricks are normally arranged in fired kiln cars in a plurality of stacks of three stacks across the width of the kiln car and three stacks along the length thereof. The number of stacks may vary depending upon the size of the kiln car. Each stack includes a plurality of double-layer courses of brick with each successive course having the headers facing perpendicular to the headers of the previous course. Each layer of each course contains a plurality of rows and columns with 4 rows and 11 brick per column being the most common. The bricks in each column are arranged end-to-end and the bricks in the rows are spaced apart from side-to-side to allow hot gases from the kiln to more uniformly penetrate the stack of bricks.

The stacks on the kiln car generally do not correspond to the stacks in the final strapped package as far as the number of brick in each row is concerned or the number of rows in each stack. Therefore, the courses of brick cannot be removed directly from the kiln car and stacked directly atop each other to form the final package because the number of bricks in each column or row on the kiln car is not generally the same as the number of bricks in each column or row on a finished package.

For the most part, this is immaterial as the stacker successfully receives columns of bricks from the kiln car continuously fed into it, and forms the brick into one continuous columnar package, which is subsequently cut off to the desired number of columns. However, the grouping of the brick courses unloaded from the kiln car into courses having the proper number of rows for the final package does present a problem.

One solution to this problem includes a breaking-down of courses from the kiln car into single rows on an off-bearing conveyor, moving the bricks in a single file along the conveyor and regrouping by some mechanism at the end of the conveyor at the proper number of rows. The rows are then reformed into courses and stacks in the final package.

Another solution to the problem is shown in U.S. Pat. No. 3,776,398, issued to Stewart et al., wherein a special pick-up head unloads the bricks from the kiln car and transfers them to the conveyor to rearrange bricks in mid-air by shifting the pick-up gripper elements.

Finally, U.S. Pat. No. 3,964,597, issued to Brown et al., discloses an apparatus in which brick courses are successively lifted and transferred from a kiln car onto the receiving end of a marshalling table with the longitudinal dimension of the bricks extending transversely to the table. A push mechanism pushes against the cut surface of the bricks and moves the bricks longitudinally on the table toward the discharge end thereof and urges the bricks against an upstanding wall of a moveable marshalling carriage. The carriage slides from a first position beneath the discharge end of the marshalling table to a second position beyond the discharge end in response to the pressure entered by the push mechanism. When a prescribed number of brick have been pushed against the upstanding wall and the moveable carriage moved to a second position, the push mechanism is deactivated and a clamp engages and holds the brick remaining on the marshalling table. The marshalling carriage is then moved an additional distance to space the bricks thereon from the bricks remaining on the marshalling table. A transfer push-off them moves the bricks from the carriage transversely from the receiving end of a conveying apparatus from where the bricks are moved to a stacking and strapping apparatus. However, this system does not provide any means for increasing the number of rows of brick, but only the number of brick in each row.

Thus, there remains a need for new and improved dehacking apparatus which is operable to adjust the number of brick in each row of a course of bricks while, at the same time, providing means for adjusting the number of rows of brick in each course. Such an apparatus permits a great flexibility in kiln car arrangement while still being operable to provide a standard size package of brick for strapping. In addition, such an apparatus may be adapted to receive brick from two kiln cars at the same time and selectively blend courses of brick from each car.

SUMMARY OF THE INVENTION

The present invention is directed to a brick dehacking apparatus which is operable to vary the number of rows of brick and number of brick in a row of brick courses removed from a kiln car and selectively combine and alternate courses of brick removed from at least two kiln cars in preparation for stacking and straping.

A first grouping means having a receiving end and a discharge end accumulates and moves a predetermined number of rows of brick from the courses of brick removed from the first kiln car and deposited on the receiving end towards the discharge end. A second grouping means having a receiving end and a discharge end located transversely to the discharge end of the first grouping means accumulates and moves a predetermined number of brick in the predetermined rows of brick received from the first grouping means and deposited on the receiving end towards the discharge end.

A third grouping means having a receiving end and a discharge end accumulates and moves a predetermined number of rows of brick from the courses of brick removed from the second kiln car and deposited on the receiving end towards the discharge end. A fourth grouping means having a receiving end and a discharge end located transversely to the discharge end of the third grouping means accumulates and moves a predetermined number of brick in the predetermined rows of brick received from the first grouping means and deposited on the receiving end towards the discharge end.

A blending table having a pair of split tables selectively combines and alternates courses of brick removed from the first and second kiln cars located between the second and fourth grouping means. The blending table includes: a first split table having a stop along one edge for accumulating and moving a predetermined number of brick arranged in at least one row removed from the second grouping means; a second split table having a stop along one edge for accumulating and moving a predetermined number of brick arranged in at least one row removed from the fourth grouping means, wherein the stops of the first and second split tables are generally parallel and aligned with respect to one another; and a discharge pusher assembly located transversely to the first and second split tables selectively discharges brick from the first split table, the second split table, and the first and second split tables.

A rotatable set-down transfer head moves the courses of brick having a predetermined number of rows of brick and a predetermined number of brick in each row of brick from the discharge end of the blending table to a conveying means. The conveying means conveys the courses of brick to a stacking and strapping station.

Accordingly, one aspect of the present invention is to provide an apparatus for varying the number of rows of brick and number of brick in a row of brick courses removed from a kiln car in preparation for stacking and straping. The apparatus includes: (a) a first grouping means having a receiving end and a discharge end and means for accumulating and moving a predetermined number of rows of brick from the courses of brick removed from the kiln cars and deposited on the receiving end towards the discharge end; (b) a second grouping means having a receiving end and a discharge end located transversely to the discharge end of the first grouping means and means for accumulating and moving a predetermined number of brick in the predetermined rows of brick received from the first grouping means and deposited on the receiving end towards the discharge end; and (c) conveying means located adjacent to the discharge end of the second grouping means for receiving the courses of brick having a predetermined number of rows of brick and a predetermined number of brick in each row of brick and conveying the courses of brick to a stacking and strapping station.

Another aspect of the present invention is to provide an apparatus for selectively combining and alternating courses of brick removed from at least two kiln cars in preparation for stacking and straping. The apparatus includes: (a) a first split table having a stop along one edge for accumulating and moving a predetermined number of brick arranged in at least one row removed from a first kiln car; (b) a second split table having a stop along one edge for accumulating and moving a predetermined number of brick arranged in at least one row removed from a second kiln car, wherein the stops of the first and second split tables are generally parallel and aligned with respect to one another; and (c) a discharge pusher assembly located transversely to the first and second split tables for selectively discharging brick from the first split table, the second split table, and the first and second split tables.

Still another aspect of the present invention is to provide an apparatus for varying the number of rows of brick and number of brick in a row of brick courses removed from a kiln car and for selectively combining and alternating courses of brick removed from at least two kiln cars in preparation for stacking and straping. The apparatus includes: (a) a first grouping means having a receiving end and a discharge end and means for accumulating and moving a predetermined number of rows of brick from the courses of brick removed from the first kiln car and deposited on the receiving end towards the discharge end; (b) a second grouping means having a receiving end and a discharge end located transversely to the discharge end of the first grouping means and means for accumulating and moving a predetermined number of brick in the predetermined rows of brick received from the first grouping means and deposited on the receiving end towards the discharge end; (c) a third grouping means having a receiving end and a discharge end and means for accumulating and moving a predetermined number of rows of brick from the courses of brick removed from the second kiln car and deposited on the receiving end towards the discharge end; (d) a fourth grouping means having a receiving end and a discharge end located transversely to the discharge end of the third grouping means and means for accumulating and moving a predetermined number of brick in the predetermined rows of brick received from the first grouping means and deposited on the receiving end towards the discharge end; (e) blending means for selectively combining and alternating courses of brick removed from the first and second kiln cars located between the second and fourth grouping means. The blending means includes: (i) a first split table having a stop along one edge for accumulating and moving a predetermined number of brick arranged in at least one row removed from the second grouping means; (ii) a second split table having a stop along one edge for accumulating and moving a predetermined number of brick arranged in at least one row removed from the fourth grouping means, wherein the stops of the first and second split tables are generally parallel and aligned with respect to one another; and (ii) a discharge pusher assembly located transversely to the first and second split tables for selectively discharging brick from the first split table, the second split table, and the first and second split tables; and (f) conveying means located adjacent to the means for selectively combining and alternating courses of brick removed from the first and second kiln cars for receiving the courses of brick and conveying the courses of brick to a stacking and strapping station.

These and other aspects of the present invention will become apparent to those skilled in the art after a reading of the following description of the preferred embodiment when considered with the drawings.

BRIEF DESCRIPTION OF THE DRAWINGS

FIG. 3 is an enlarged, cross-sectional view of the pusher plate and lift assembly shown in FIG. 2, taken along lines 3—3;

FIGS. 4A–4I illustrate the sequence of movement of brick along the grouping conveyor shown in FIG. 2;

FIG. 6 is an enlarged front view of the blending table assembly shown in FIG. 1;

FIG. 7 is a cross-sectional view of the blending table assembly shown in FIG. 5, taken along lines 7—7;

FIG. 13 is an enlarged front view of the discharge pusher assembly shown in FIG. 5;

FIG. 14A–I illustrates the sequence of movement of brick through the split table for alternating courses of brick;

DESCRIPTION OF THE PREFERRED EMBODIMENTS

Figure 1:
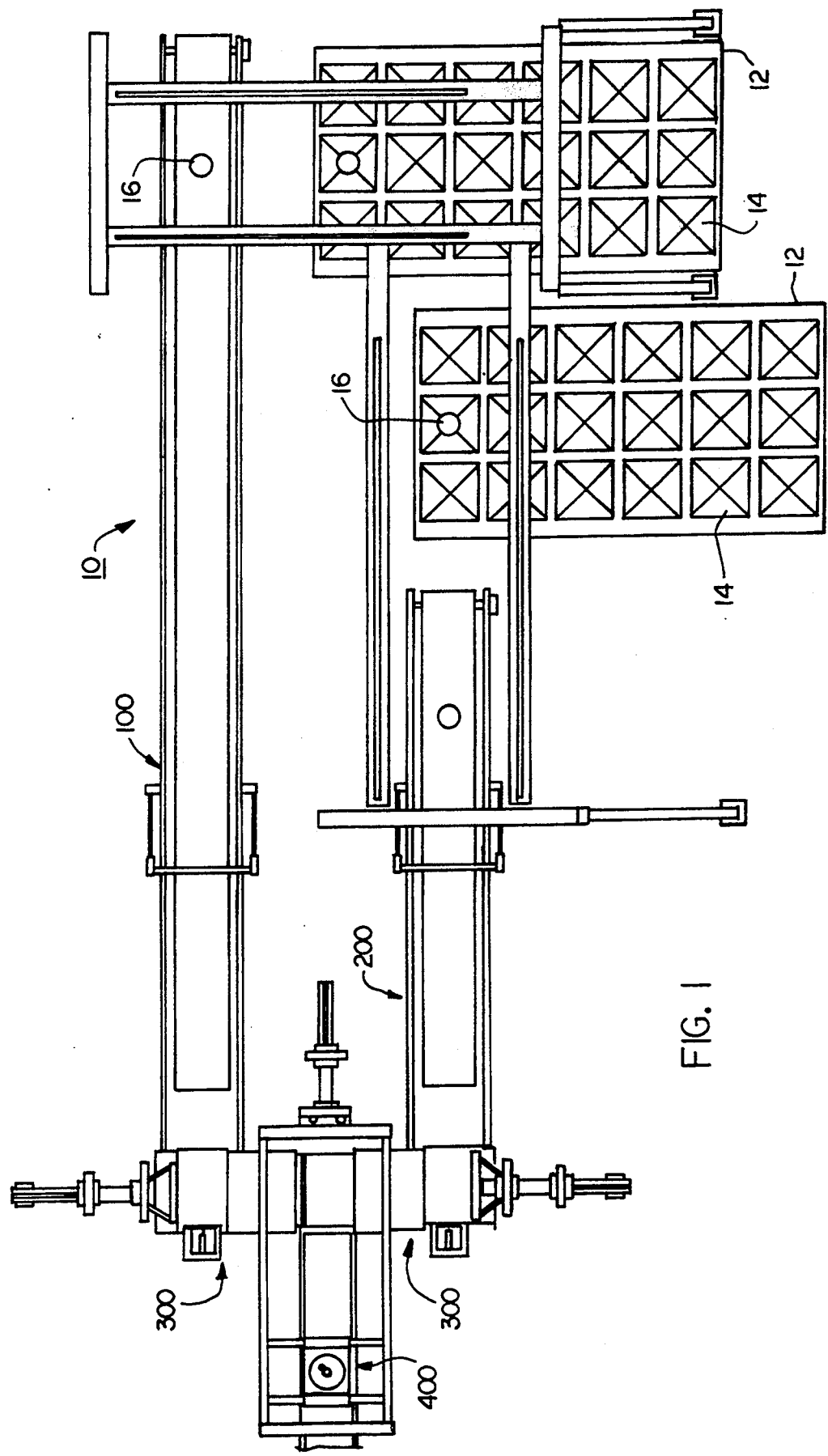
FIG. 1 is a planned view of a brick dehacker constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a dehacker apparatus, generally designated 10, is shown constructed according to the present invention. The dehacker apparatus includes three major subassemblies: a pair of parallel grouping conveyors 100, 200; a blending table 300; and a rotatable set-down transfer head 400.

In operation, kiln cars 12 are moved into position adjacent to ends of grouping conveyors 100, 200. The alternating courses of brick are unloaded from stacks 14 and placed on the front end of each grouping conveyor 100, 200. The stacks of brick proceed along the length of each grouping conveyor 100, 200 where they are grouped into the proper number of rows of brick for the final package. The blending table 300 produces the proper number of brick in each row either all from one conveyor, alternating courses from each conveyor, or mixing courses from each conveyor. The rotatable set-down transfer head 400 removes the blended courses of brick from the blending table 300 and places the blended courses of brick on a conveyor assembly which takes the courses of brick, now having the proper number of brick in each row and the proper number of rows, to a conventional strapper (not shown).

As can be seen, the present invention allows great flexibility in the arrangement of rows and number of brick in each row on the kiln car since the stacks of brick can be rearranged to provide the proper number of rows and number of brick in each row. In addition, the present invention allows for blending of brick from more than one kiln car. Finally, the rotatable set-down transfer head permits additional blending by rotating alternate courses of brick end-to-end.

Figure 2:
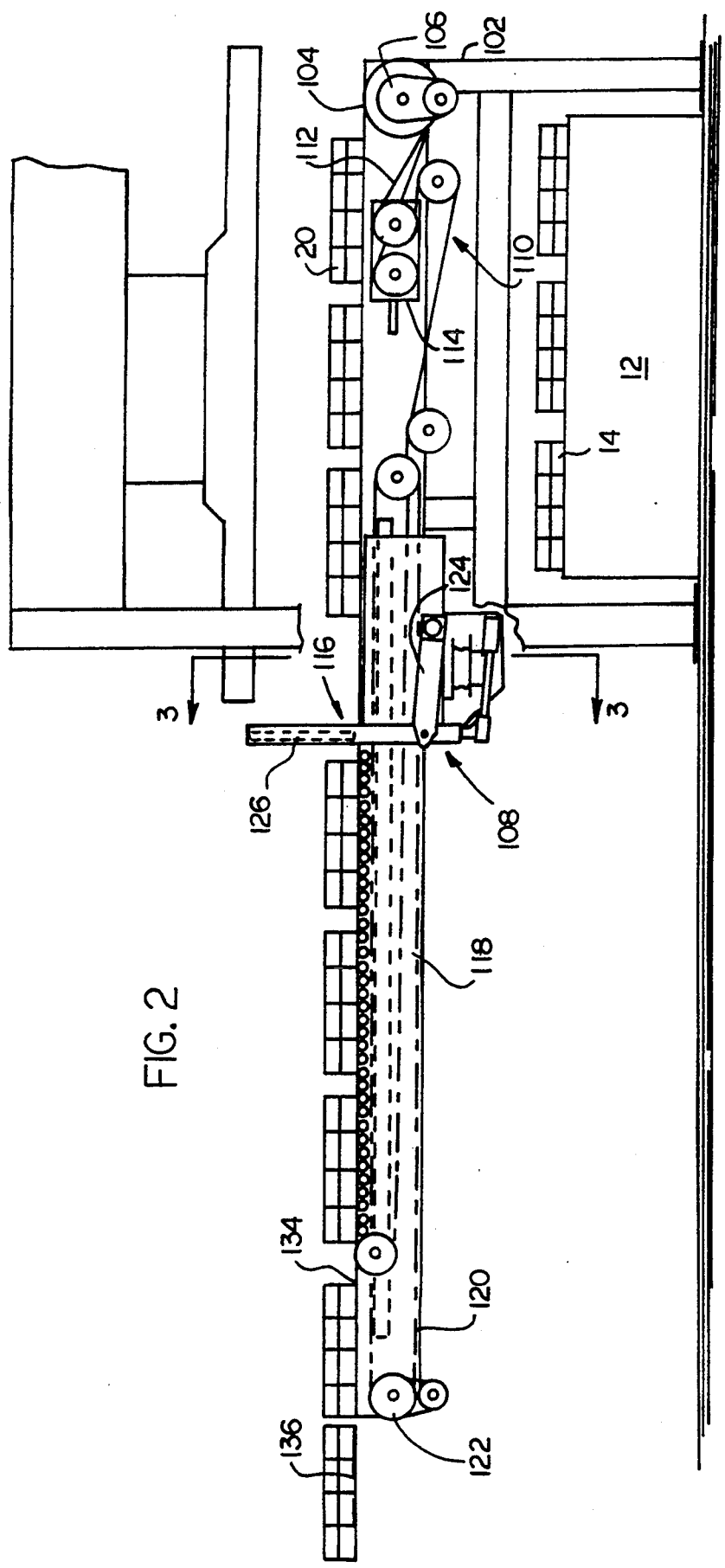
FIG. 2 is a side view of the grouping conveyor shown in FIG. 1.
Figure 4D:
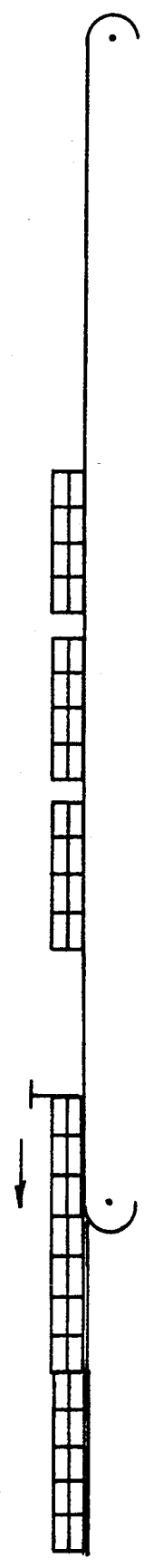
Figure 4E:
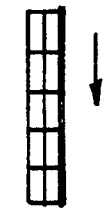
Figure 4F:
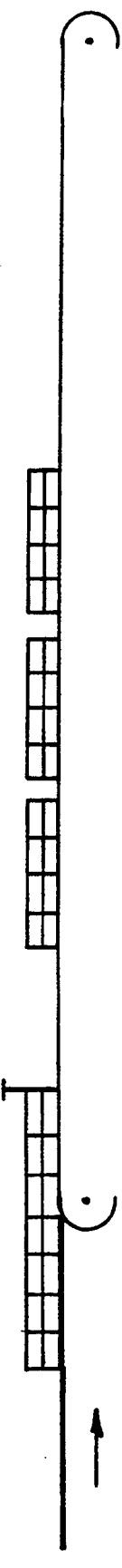
Figure 4G:
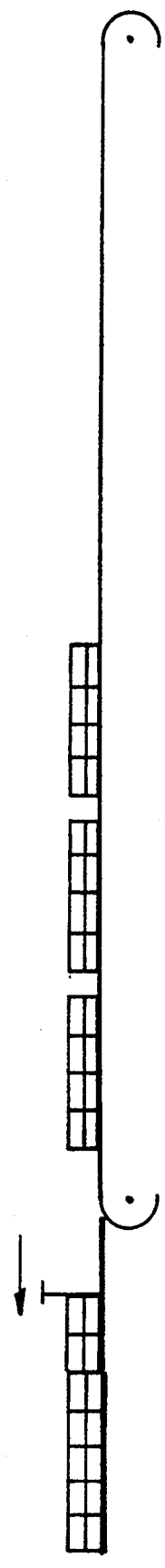
Figure 4H:
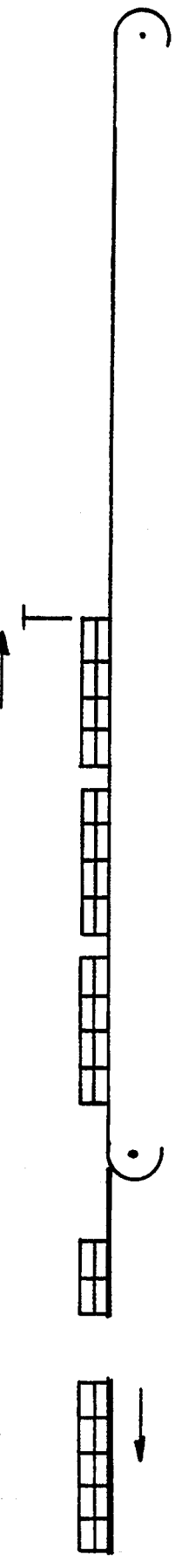
Figure 4I:
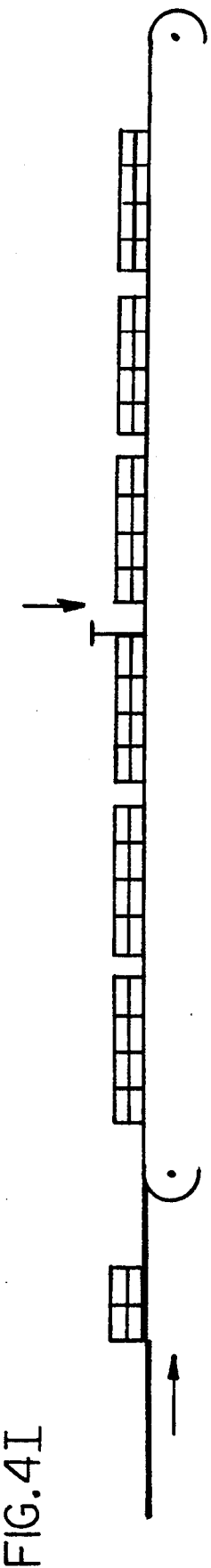

Turning now to FIG. 2, there is shown a side view of the grouping conveyor 100 shown in FIG. 1. Grouping conveyor 200 is essentially identical and differs only in its staggered length to permit two rows of kiln cars to be accessed.

Grouping conveyor 100 includes a support frame 102 for supporting a flexible belt 104. Belt 104 is driven by a hydraulic motor 106 having a flow control for accurately controlling the speed of the motor. A pusher assembly 108 is transversely mounted to frame 102. A take-up means 110 keeps the surface of the belt 104 in tension. Take-up means 110 includes a serpentine loop 112 coupled with a preloaded spring 114.

Pusher plate and lift assembly 116 is mounted to frame 102 by track 118. Pusher plate and lift assembly 116 is connected by a chain drive 120 to hydraulic motor 122 which is also controlled by a flow controller. Pusher plate and lift assembly 116 includes a pair of parallel arms 124 attached between track 118 and pusher plate and frame 126 to form a parallelogram by which the pusher plate frame 126 moves substantially parallel to the surface of the bricks in the unstacked courses of brick 20.

A surge plate 134 and split plate measuring table 136 located at the discharge end of the grouping conveyor 100 cooperate with the pusher plate and lift assembly 116 to group the courses of brick from the kiln cars into the proper number of rows of brick for the final package, as will be best understood from FIG. 4.

As can be seen in FIG. 3, there is shown an enlarged, cross-sectional view of the pusher plate and lift assembly shown in FIG. 2, taken along lines 3—3. An actuator 128 located between frame 102 and the pusher plate and lift assembly 116 moves the pusher plate and frame from a first position adjacent to the upper surface of belt 104 to a second position above belt 104. Actuator 128 includes an air bag 130 and a lever arm 132, whereby expansion of air bag 130 causes the lever arm 132 to rotate parallel arms 124 upward, thereby moving pusher plate and frame 126 away from the surface of belt 104.

The sequence of movement of the brick through the grouping conveyor shown in FIG. 2 can best be understood by reviewing FIGS. 4A–4I. Courses of brick including 4 rows each with 11 brick in each row, for example, are unloaded from the kiln car by a conventional overhead stacker/gripper (4A). After the courses of brick are released, the conveyor belt is indexed forward past the pusher plate (4B). The belt is then stopped and additional courses of brick may be set down on the surface of the belt. At this point, the pusher plate drops down behind the forward courses of brick (4C).

The belt and pusher plate then are indexed forward together at substantially the same speed to push and regroup the three groups of 4 rows each of brick into a 12-row group (4D). In the preferred embodiment, 5 rows of brick, corresponding to the final number of rows in the stacked and final package, extend over into the split plate measuring table, 4 rows remains on the surge plate and 3 rows remain on the discharge end of belt.

The split plate measuring table, now having the desired number of rows of brick, moves away from the surge plate to where the brick are combined in the blending table as will be discussed later (4E). The split table then returns to its position adjacent to the surge plate (4F). The pusher plate then makes a second push to load an additional 5 rows of brick onto the surge plate (4G). As before, the belt is indexed forward with the pusher plate to prevent damage to the under-side of the brick.

The split plate measuring table again moves the brick to the blending table, like step 4E, while the pusher plate moves back to its original position to permit the next group of brick to pass underneath (4H). At this point, the pusher plate drops down behind the ungrouped courses of bricks and the split plate returns adjacent to the surge plate (4I), similar to step 4C. Steps 4D–4H are then continuously repeated whereby the proper number of rows of brick are loaded onto the split plate measuring table and taken to the blending table.

Figure 5:
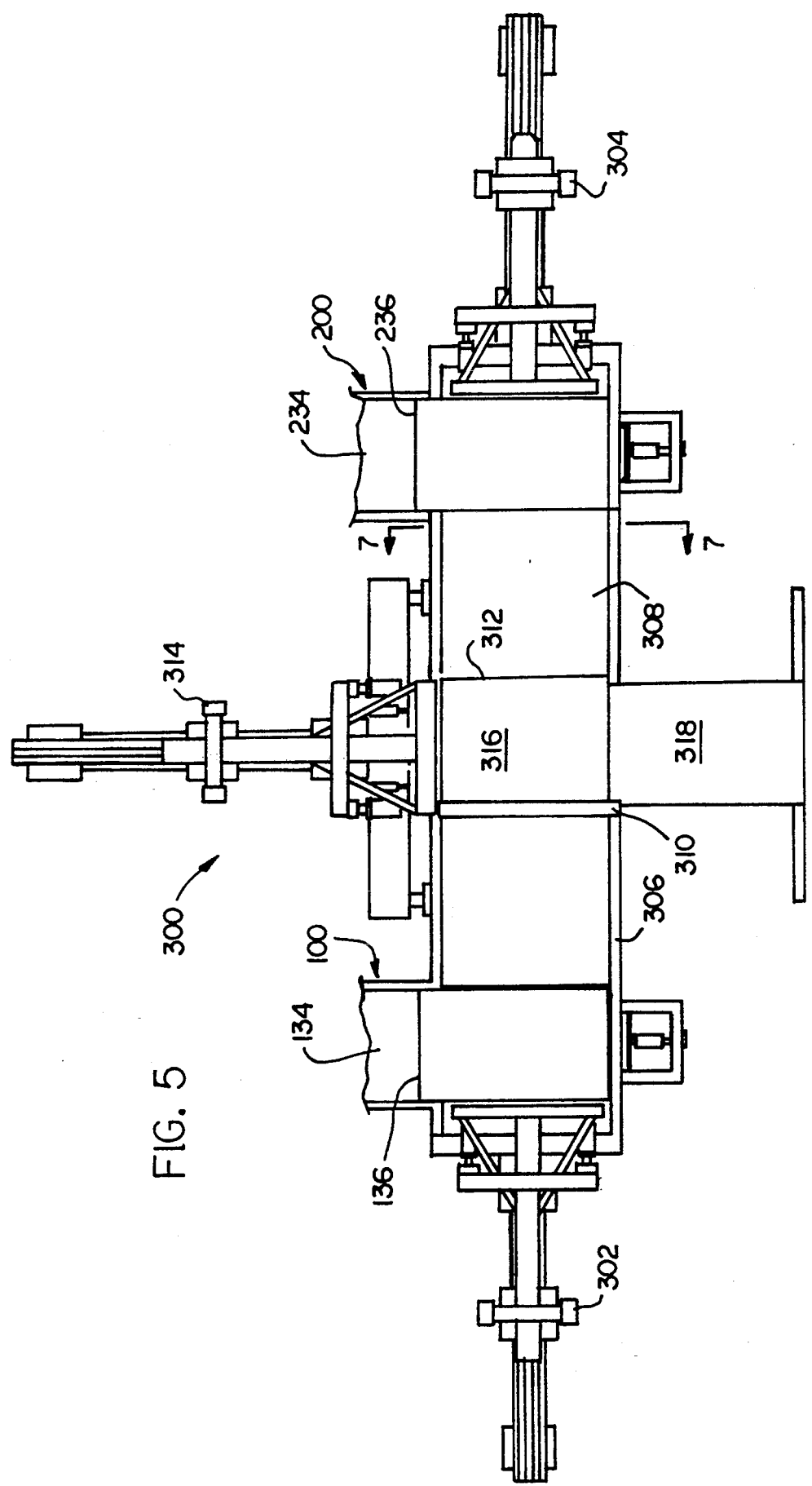
FIG. 5 is an enlarged plan view of the blending table assembly shown in FIG. 1.

Turning now to FIG. 5, there is shown an enlarged plan view of the blending table assembly shown in FIG. 1. In the preferred embodiment, the blending table 300 includes a pair of opposed charging pushers 302, 304. Surge tables 306, 308 are located adjacent to the discharge end of each charging pusher charger 302, 304. Brick clamps 310, 312 are located on the discharge end of each surge table. A discharge pusher 314 is located perpendicular to the charging pushers 302, 304. The split table assembly 316 is located between surge tables 306, 308. A discharge table 318 is located adjacent to the side of the split table assembly 316 opposite discharge pushers 314. The operation of the blending table assembly 300 will be more fully discussed in FIGS. 14 and 15.

As best seen in FIG. 6, there is shown an enlarged front view of the blending table assembly 300 shown in FIG. 1. Split tables 320, 322 are modified split plates having stop plates 324, 326 attached to the edge of the split table 320, 322 opposite measuring tables 136 and 236. Actuators 328, 330 attached to the split tables permit the tables to be moved either together or separately between a plurality of positions with respect to the discharge pusher 314. This arrangement is best seen in FIG. 7, which is a cross-sectional view of the blending table assembly shown in FIG. 5, taken along lines 7—7.

Figure 8A:
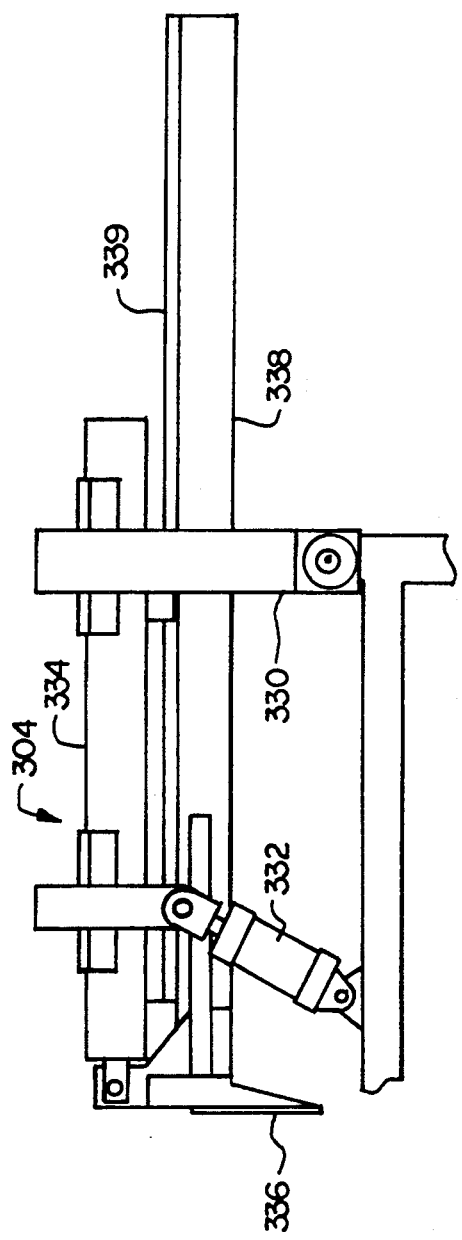
FIG. 8A is an enlarged side view of the charging pusher assembly shown in FIG. 5 in its retracted position.

As best seen in FIG. 8A, there is shown an enlarged side view of the charging pusher assembly 304 shown in FIG. 5 in its retracted position. Charging pusher 302 is identical. The charging pusher assembly 304 includes a pivotally-mounted frame 330. A lifting actuator 332, attached to the front end of the charging pusher assembly adjacent to the pusher plate 336, is operable to lift the pusher plate 336 between an operable and inoperable position with respect to the courses of brick. A pushing cylinder 334, mounted between frame 330 and plate support 338, moves the plate support 338 along track 339 when actuated.

Figure 8B:
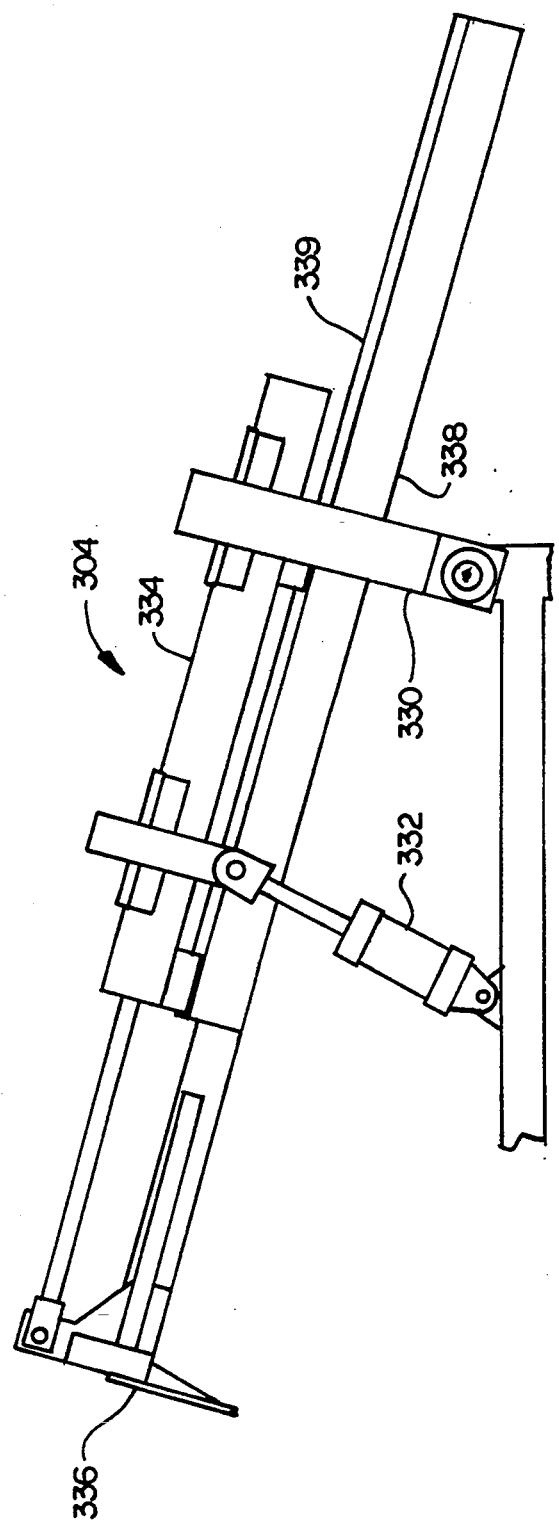
FIG. 8B is an enlarged side view of the charging pusher assembly shown in FIG. 5 in its extended position.

FIG. 8B shows an enlarged side view of the charging pusher assembly 304 shown in FIG. 5 in its extended position. Because the charging pusher assembly 302, 304 can be lifted at the end of a cycle and returned to its starting position, additional courses of brick can be loaded onto split plate measuring tables 136, 236 during this recycling time without interfering with pusher plate 336. This substantially reduces the time between cycles.

Figure 9:
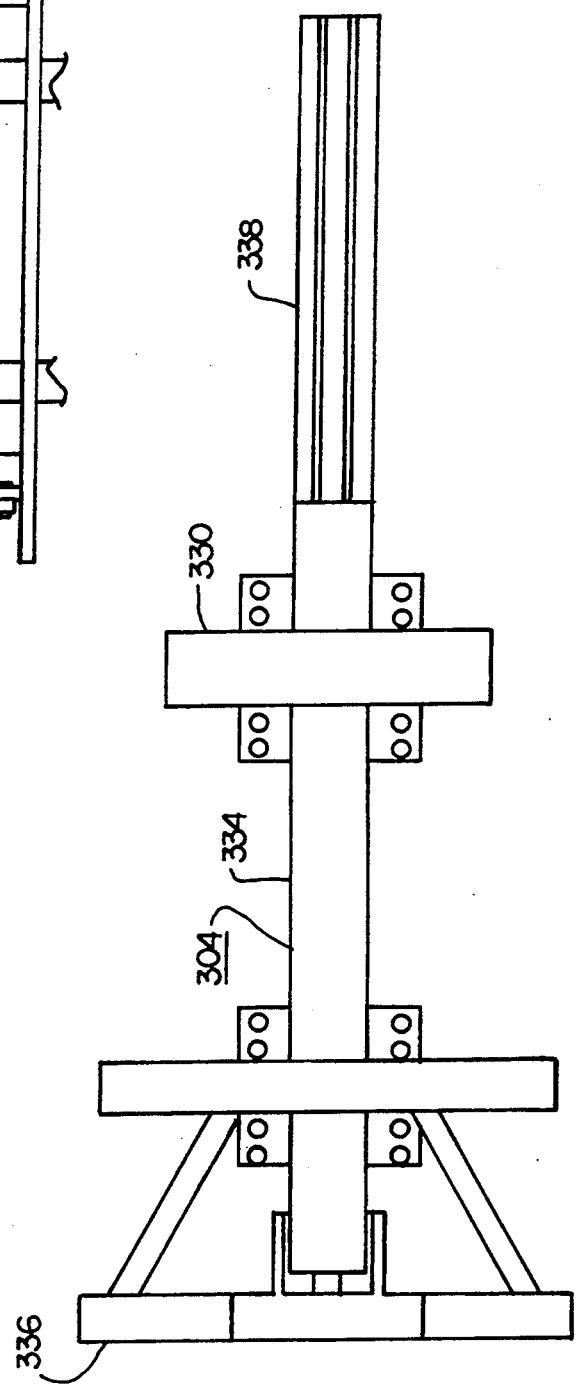
FIG. 9 is an enlarged top view of the charging pusher assembly shown in FIG. 5.

FIG. 9 is an enlarged top view of the charging pusher assembly 302 shown in FIG. 5.

Figure 10:
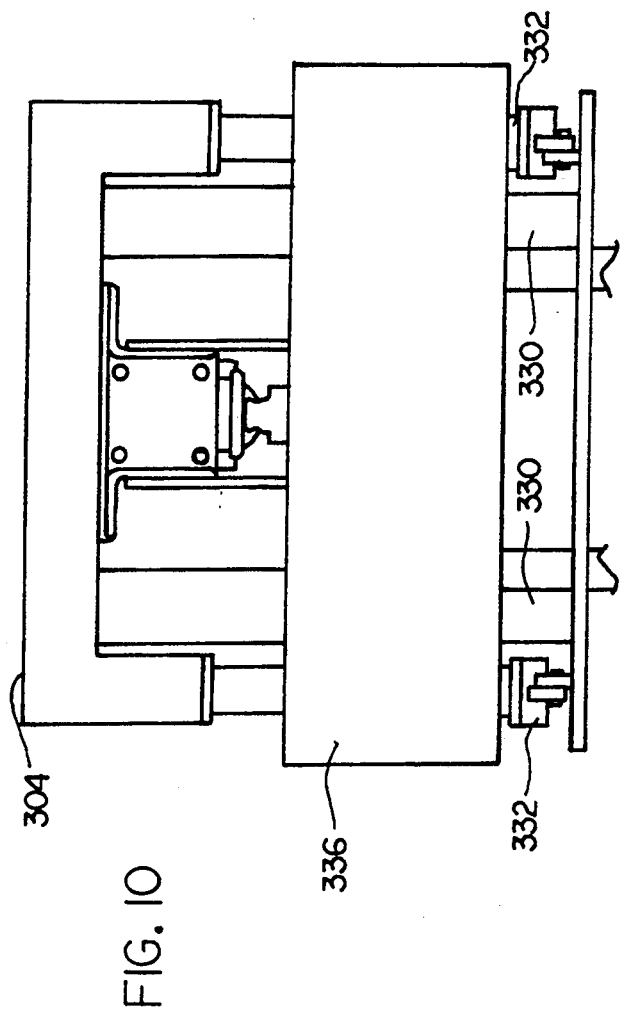
FIG. 10 is an enlarged front view of the charging pusher assembly shown in FIG. 5.

FIG. 10 is an enlarged front view of the charging pusher assembly 302 shown in FIG. 5.

Figure 11:
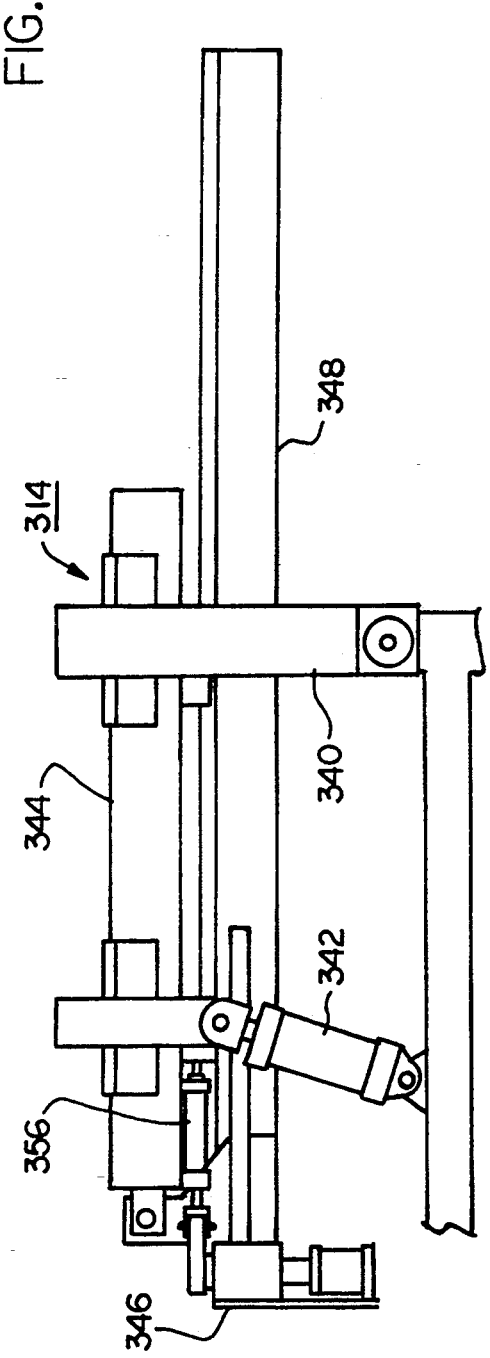
FIG. 11 is an enlarged side view of the discharge pusher assembly shown in FIG. 5 in its retracted position.
Figures 14C, 14D, 14E, 14F:
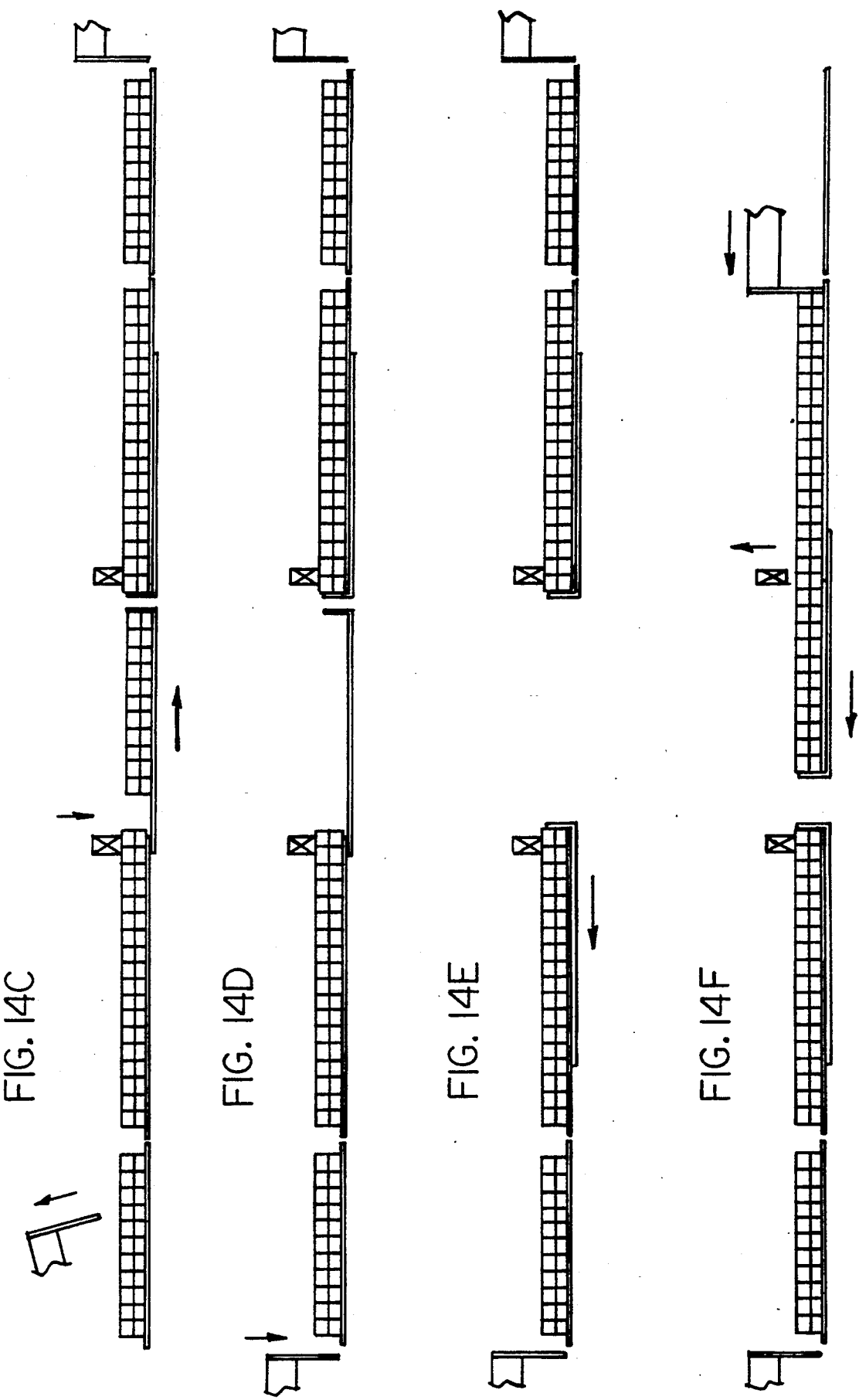
Figure 14G:
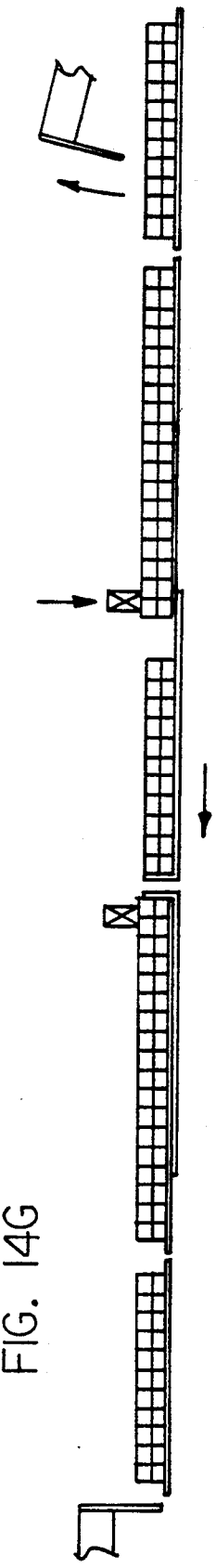
Figure 14H:
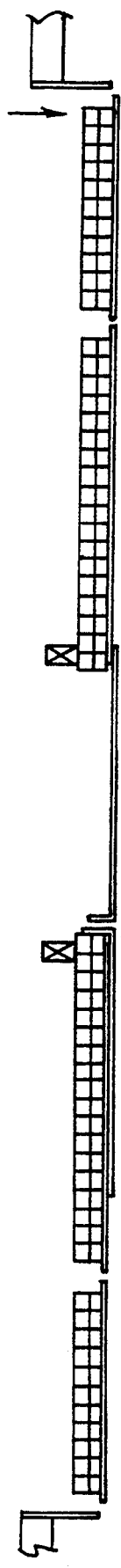
Figure 14I:
Figure 15A:
FIG. 15A–E illustrates a sequence of movement of brick through the split table for split courses of brick.
Figure 15B:
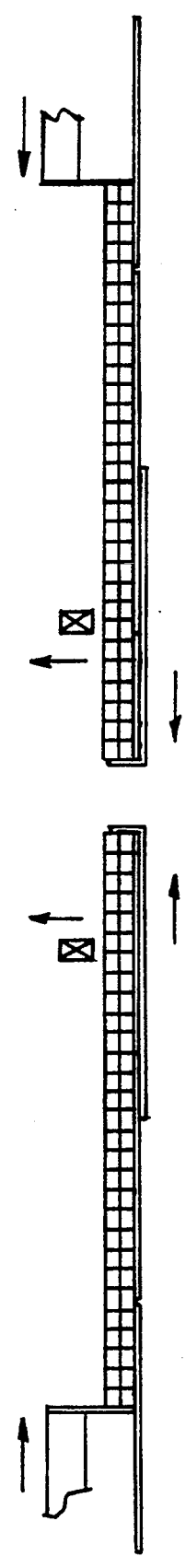
Figure 15C:
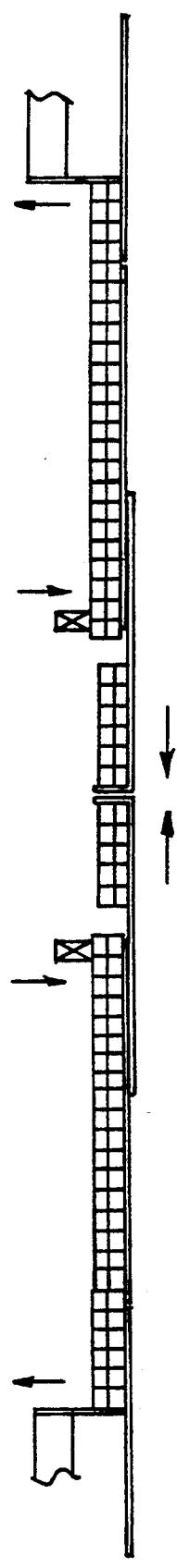
Figure 15D:
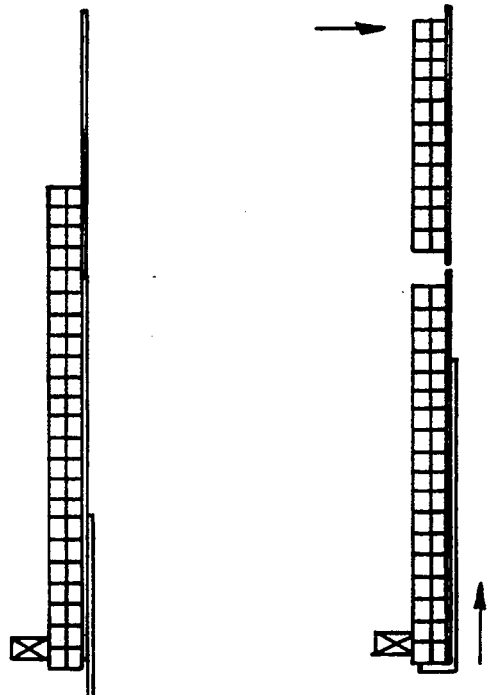
Figure 15E:
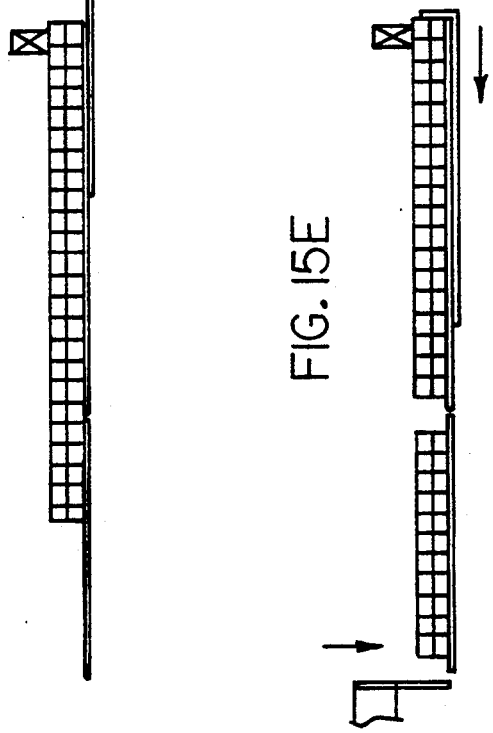

As best seen in FIG. 11, there is shown an enlarged side view of the discharge pusher assembly 314 shown in FIG. 5 in its retracted position. The discharge pusher assembly 314 includes a pivotally-mounted frame 340. A lifting actuator 342, attached to the front end of the discharge pusher assembly adjacent to the pusher plate 346, is operable to lift the pusher plate 346 between an operable and inoperable position with respect to the courses of brick. A pushing cylinder 344, mounted between frame 340 and plate support 348, moves the plate support 348 along track 349 when actuated.

Because the discharge pusher assembly 314 can be lifted at the end of a cycle and returned to its starting position, additional courses of brick can be loaded onto the split tables during this recycling time without interfering with pusher plate 346. This substantially reduces the time between cycles.

Figure 12:
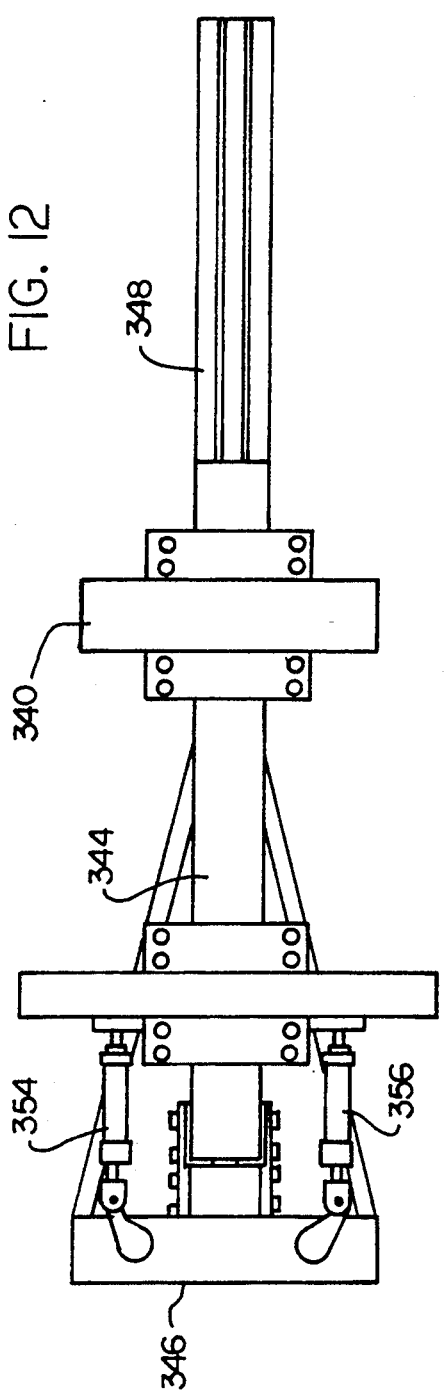
FIG. 12 is an enlarged top view the discharge pusher assembly shown in FIG. 5.

FIG. 12 is an enlarged top view of the discharge pusher assembly 314 shown in FIG. 5. Pusher plate 346 includes pivotable doors 350, 352 which are selectively opened by actuators 354, 356 to allow pusher plate 346 to pass over the split tables.

FIG. 13 is an enlarged front view of the discharge pusher assembly 314 shown in FIG. 5.

Turning now to FIG. 14, there is shown a sequence of movement in the split tables for alternating courses of brick from each conveyor. In the initial position, the split plate measuring tables 136, 236 are each loaded with brick from the grouping conveyors having the proper number of rows of brick, but not necessarily the correct number of brick per row (14A). Brick clamp 310 is raised and charging pusher 302 is actuated along with split table 320 to measure the proper number of brick per row (14B).

At this point, brick clamp 310 drops down, charger pusher 302 goes up and out of the way, a new course of brick enters the measuring table 136 from conveyor 100 and split table 320 moves into position for discharge (14C). The discharge pusher then moves the courses of brick on split table 320 onto discharge table 318 (14D). Split table 320 then returns to its position adjacent to the surge plate 306 (14E).

The operation is then repeated with the brick being supplied by conveyor 200 (14F-14I). The blending table apparatus 300 then repeats steps 14B-14I continuously to alternate courses of brick being conveyed to the strapper (not shown).

As best seen in FIG. 15, there is illustrated the sequence of movement of brick through the blending table assembly 300 for combining split courses of brick from conveyors 100, 200. The initial starting position shown in FIG. 15A is the same as the initial starting position shown in 14A.

Brick clamps 310, 312 are both raised and charging pushers 302, 304 are actuated as split tables 320, 322 are moved together (15B). Brick clamps 310, 312 drop back into position against the brick. Charging pushers 302, 304 are raised and returned to their starting position, and split tables 320, 322 make a second movement until they abut one another with the proper total number of bricks in each row (15C). The discharge pusher 314 then moves forward, pushing the brick having the proper number of brick in each row onto the discharge table 318 (15D). The split tables 320, 322 then return to their position adjacent to surge tables 306, 308, charging pushers 302, 304 drop down behind a new course of brick from conveyors 100, 200 onto split plates 136, 236 (15E).

Steps 15B-15E are then continuously repeated to blend brick from conveyors 100, 200. In the preferred embodiment, multiple doors in the pusher plate of discharge pusher 314 (see FIG. 13) permit alternately varying the number of brick from each conveyor. For example, in the preferred embodiment, the pair of adjacent doors located near the center of the pusher plate may be alternately opened and closed to permit a row of five brick from one conveyor and a row of six brick from the other conveyor (5/6) and then the reverse complement (6/5).

Figure 17:
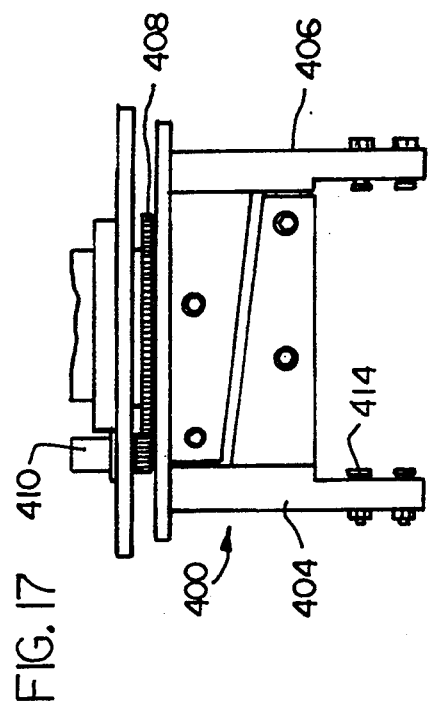
FIG. 17 is an end view of the rotatable set-down transfer head.
Figure 16:
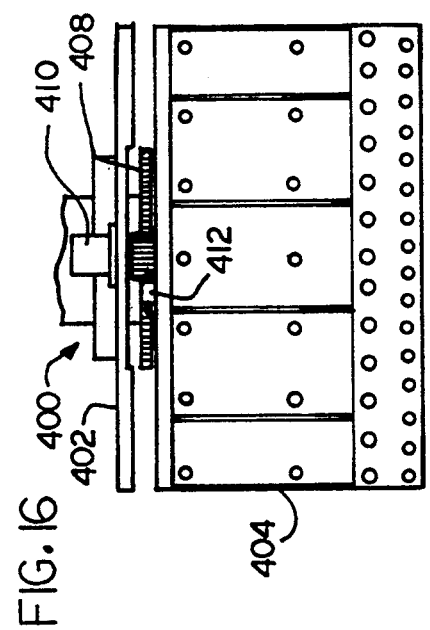
FIG. 16 is a side view of the rotatable set-down transfer head.

Now turning to FIG. 16, there is shown a side view of the rotatable set-down transfer head 400. Transfer head 400 is generally conventional in design and includes an overhead frame 402 and a pair of opposed gripper heads 404, 406. However, a slewing ring 408 is located between the frame and heads to permit rotation of the heads in a horizontal plane. A drive motor 410 engages the slewing ring 408 for rotating the heads. In the preferred embodiment, a stop 412 limits rotation of the heads between 0 and 180 degrees with respect to the downstream conveyor leading to the stacking and strapping station. In operation, rotatable set-down transfer head 400 may be selectively actuated to rotate the bricks picked up from discharge table 318 end to end. This permits an additional degree of blending over and above that achieved by blending table 316. FIG. 17 is an end view of the rotatable set-down transfer head illustrating the multipoint grippers 414.

Certain modifications and improvements will occur to those skilled in the art upon a reading of the foregoing description. By way of illustration, other complements of a final package size are also possible. For example, in a package having 11 brick in each row, other splits, such as 7/4 and 8/3 may be selected. It should be understood that all such modifications and improvements have been deleted herein for the sake of conciseness and readability but are properly within the scope of the following claims.

We claim:

1. An apparatus for selectively combining and alternating courses of brick removed from at least two kiln cars in preparation for stacking and straping, said apparatus comprising:
   (a) a first split table having a stop along one edge for accumulating and moving a predetermined number of brick arranged in at least one row removed from a first kiln car;
   (b) a second split table having a stop along one edge for accumulating and moving a predetermined number of brick arranged in at least one row removed from a second kiln car, wherein the stops of said first and second split tables are generally parallel and aligned with respect to one another; and
   (c) a discharge pusher assembly located transversely to said first and second split tables for selectively discharging brick from said first split table, said second split table, and said first and second split tables, wherein said discharge pusher assembly includes: a frame; a fluid operated cylinder attached at one end to said frame; and a plate attached to the other end of said cylinder, wherein said plate includes at least one aperture which may be selectively opened to permit said plate to pass over said stops located along one edge of each of said split tables.

2. The apparatus according to claim 1, wherein said first and second split tables each are movable between a first position adjacent to one side of said discharge pusher assembly, a second position adjacent to the other side of said discharge pusher assembly, and at least a third position in between said first and second positions.

3. The apparatus according to claim 1, wherein said cylinder is pivotally attached to said frame.

4. The apparatus according to claim 3, further including a second fluid operated cylinder attached between said frame and first cylinder for raising and lowering said discharge pusher assembly.

5. An apparatus for varying the number of rows of brick and number of brick in a row of brick courses removed from a kiln car and for selectively combining and alternating courses of brick removed from at least two kiln cars in preparation for stacking and straping, said apparatus comprising:
   (a) a first grouping means having a receiving end and a discharge end and means for accumulating and moving a predetermined number of rows of brick from said courses of brick removed from said first kiln car and deposited on said receiving end towards said discharge end;
   (b) a second grouping means having a receiving end and a discharge end located transversely to the discharge end of said first grouping means and means for accumulating and moving a predetermined number of brick in said predetermined rows of brick received from said first grouping means and deposited on said receiving end towards said discharge end;
   (c) a third grouping means having a receiving end and a discharge end and means for accumulating and moving a predetermined number of rows of brick from said courses of brick removed from said second kiln car and deposited on said receiving end towards said discharge end;
   (d) a fourth grouping means having a receiving end and a discharge end located transversely to the discharge end of said third grouping means and means for accumulating and moving a predetermined number of brick in said predetermined rows of brick received from said first grouping means and deposited on said receiving end towards said discharge end;
   (e) blending means for selectively combining and alternating courses of brick removed from said first and second kiln cars located between said second and fourth grouping means, said blending means including:
      (i) a first split table having a stop along one edge for accumulating and moving a predetermined number of brick arranged in at least one row removed from said second grouping means;
      (ii) a second split table having a stop along one edge for accumulating and moving a predetermined number of brick arranged in at least one row removed from said fourth grouping means, wherein the stops of said first and second split tables are generally parallel and aligned with respect to one another; and
      (ii) a discharge pusher assembly located transversely to said first and second split tables for selectively discharging brick from said first split table, said second split table, and said first and second split tables, wherein said discharge pusher assembly includes: a frame; a fluid operated cylinder attached at one end to said frame; and a plate attached to the other end of said cylinder, wherein said plate includes at least one aperture which may be selectively opened to permit said plate to pass over said stops located along one edge of each of said split tables; and
   (f) conveying means located adjacent to said means for selectively combining and alternating courses of brick removed from said first and second kiln cars for receiving said courses of brick and conveying said courses of brick to a stacking and strapping station.

6. The apparatus according to claim 5, further including a rotatable set-down transfer head for moving said courses of brick having a predetermined number of rows of brick and a predetermined number of brick in each row of brick from the discharge end of said grouping means to said conveying means.

7. The apparatus according to claim 5, wherein said first and third grouping means having a receiving end and a discharge end and means for accumulating and moving a predetermined number of rows of brick removed from said kiln cars and deposited on said receiving end towards said discharge end include: a frame; a conveying belt attached to said frame; a motor for driving said belt; a split plate located adjacent to the discharge end of said grouping means and a pusher assembly for moving said predetermined number of rows of brick from said conveying belt onto said split plate.

8. The apparatus according to claim 7, further including a take-up means for maintaining said belt under tension.

9. The apparatus according to claim 8, wherein said take-up means is a serpentine loop and spring arrangement.

10. The apparatus according to claim 7, wherein said pusher assembly includes: a track guide attached to said frame parallel to the surface of said belt; a plate and lift assembly slidably mounted in said track guide; a motor for moving said plate and lift assembly at the same speed as said conveying belt; and a chain drive connecting said motor and said plate and lift assembly.

11. The apparatus according to claim 10, wherein said plate and lift assembly includes: a plate and pusher assembly frame slidably mounted in said track guide; a first pair of arms attached at one end to each side of said frame; a plate attached to the other end of said first pair of arms and transversely extending across said belt; and an actuator for raising and lowering said plate with respect to the upper surface of said belt.

12. The apparatus according to claim 11, wherein said plate and lift assembly further includes a second pair of arms parallel to said first pair of arms for forming a parallelogram, whereby said plate remains substantially perpendicular to the surface of said belt as said plate is raised and lowered.

13. The apparatus according to claim 11, wherein said actuator includes an air bag located between said frame and said first pair of arms.

14. The apparatus according to claim 5, wherein said second and fourth grouping means having a receiving end and a discharge end located transversely to the discharge end of said first and third grouping means and means for accumulating and moving a predetermined number of brick in said predetermined rows of brick received from said first grouping means and deposited on said receiving end towards said discharge end includes: a split plate located adjacent to the discharge end of said grouping means and a pusher assembly for moving said predetermined number of brick in said predetermined number of rows of brick onto said split plate.

15. The apparatus according to claim 14, further including a surge table located between said split plate and said pusher assembly and a brick clamp located along the edge of said surge table adjacent to said split plate.

16. The apparatus according to claim 14, wherein said pusher assembly includes: a frame; a fluid operated cylinder attached at one end to said frame; and a plate attached to the other end of said cylinder.

17. The apparatus according to claim 16, wherein said cylinder is pivotally attached to said frame.

18. The apparatus according to claim 17, further including a second fluid operated cylinder attached between said frame and first cylinder for raising and lowering said pusher assembly.

19. The apparatus according to claim 5, wherein said first and second split tables each are movable between a first position adjacent to one side of said discharge pusher assembly, a second position adjacent to the other side of said discharge pusher assembly, and at least a third position in between said first and second positions.

20. The apparatus according to claim 5, wherein said cylinder is pivotally attached to said frame.

21. The apparatus according to claim 20, further including a second fluid operated cylinder attached between said frame and first cylinder for raising and lowering said discharge pusher assembly.

* * * * *